(12) United States Patent
Khandekar et al.

(10) Patent No.: US 9,410,074 B2
(45) Date of Patent: *Aug. 9, 2016

(54) COMPOSITIONS AND METHODS FOR INHIBITING NAPHTHENATE SOLIDS FORMATION FROM LIQUID HYDROCARBONS

(75) Inventors: Chandrashekhar Khandekar, Katy, TX (US); Suguna Gopal, Dubai (AE); James Smith, Bentley (AU)

(73) Assignee: M-I L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/511,770

(22) PCT Filed: Nov. 25, 2010

(86) PCT No.: PCT/AU2010/001584
§ 371 (c)(1),
(2), (4) Date: Aug. 15, 2012

(87) PCT Pub. No.: WO2011/063459
PCT Pub. Date: Jun. 3, 2011

(65) Prior Publication Data
US 2012/0310022 A1 Dec. 6, 2012

(30) Foreign Application Priority Data
Nov. 26, 2009 (AU) .............................. 2009905893

(51) Int. Cl.
| | | |
|---|---|---|
| C07C 7/10 | (2006.01) | |
| C11D 17/08 | (2006.01) | |
| A61K 8/73 | (2006.01) | |
| C09K 8/524 | (2006.01) | |

(52) U.S. Cl.
CPC ...................... *C09K 8/524* (2013.01)

(58) Field of Classification Search
None
See application file for complete search history.

(56) References Cited

U.S. PATENT DOCUMENTS

| | | | |
|---|---|---|---|
| 5,556,451 A | 9/1996 | Minevski | |
| 6,096,196 A | 8/2000 | Varadaraj et al. | |
| 2004/0023817 A1 | 2/2004 | Taylor et al. | |
| 2004/0147404 A1* | 7/2004 | Thaemlitz et al. | 507/100 |
| 2005/0267007 A1 | 12/2005 | Sanner et al. | |
| 2005/0282711 A1 | 12/2005 | Ubbels et al. | |
| 2005/0282915 A1 | 12/2005 | Ubbels | |
| 2007/0125987 A1 | 6/2007 | Hills et al. | |
| 2010/0175315 A1 | 7/2010 | McRobbie et al. | |
| 2011/0237469 A1* | 9/2011 | Khandekar et al. | 507/235 |

FOREIGN PATENT DOCUMENTS

| | | | |
|---|---|---|---|
| CN | 101508650 A | 8/2009 | |
| EP | 1293550 A2 | 3/2003 | |
| GB | 847762 A | 9/1960 | |
| WO | 2004065518 A1 | 8/2004 | |
| WO | WO2005100534 | * 10/2005 | C11D 17/00 |
| WO | 2006025912 A2 | 3/2006 | |
| WO | 2007065107 A2 | 6/2007 | |
| WO | 2008155333 A1 | 12/2008 | |
| WO | 2010017575 A1 | 2/2010 | |

OTHER PUBLICATIONS

Goldszal, et al., "Scale and Naphthenate Inhibition in Deep-Offshore Fields", SPE 74661, SPE Oilfield Scale Symposium, Aberdeen, UK, Jan. 2002, pp. 1-11.
International Preliminary Report on Patentability issued in PCT/AU2010/001219 on Mar. 29, 2012, 10 pages.
Patent Examination Report No. 1 issued in Australia Patent Application No. 2010295249 on Sep. 20, 2013, 3 pages.
International Preliminary Report on Patentability issued in PCT/AU2010/001584 on Jun. 7, 2012, 11 pages.
Patent Examination Report No. 1 issued in Australia Patent Application No. 201324533 on Jan. 8, 2013, 4 pages.
European Search Report issued in Application No. 10832421.1 on Aug. 21, 2013; 9 pages.
Petroleum Extension Service, "Treating Oilfield Emulsions", University of Texas at Austin, 4th Edition, Apr. 1, 1990, 115 pages.
Examination Report issued in AU2014240322 on Jul. 10, 2015, 4 pages.
Search Report issued in AU2009905893 on Jun. 16, 2010, 3 pages.

* cited by examiner

*Primary Examiner* — Clinton Brooks

(57) ABSTRACT

The present invention relates to a composition and method for inhibiting the formation of naphthenate solids in a liquid hydrocarbon. The method includes contacting a composition including a rosin amine having a formula (I): or (II): where formula (AA): represents a single or double bond; R1, R2 and R5 each independently represent H, alkyl, alkenyl or an alkynyl group each having between one and ten carbon atoms, —(R3O)nR4 wherein R3 is an alkyl group having 1 to 3 carbon atoms and R4 is H, alkyl, alkenyl or an alkynyl group each having between one and ten carbon atoms; n is an integer between 5 and 50; X is a halide, sulphate, phosphate or acetate ion; and a demulsifier intermediate with the liquid hydrocarbon.

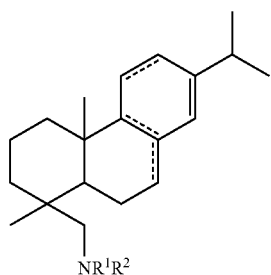

(I)

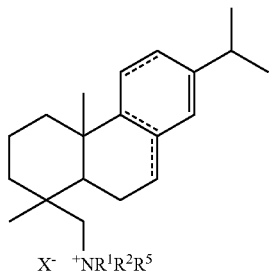

(II)

----- (AA)

24 Claims, 1 Drawing Sheet

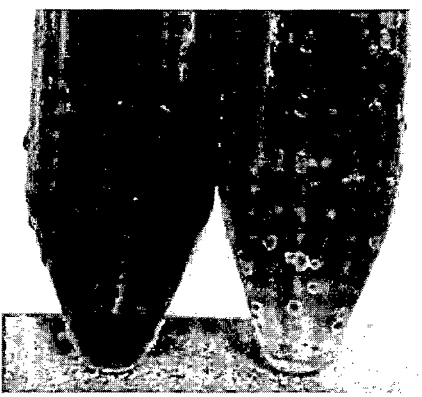
A
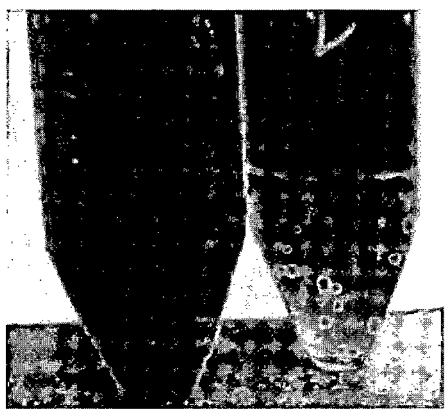
B
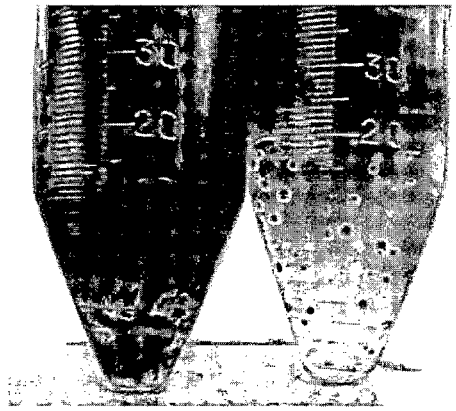
C

COMPOSITIONS AND METHODS FOR INHIBITING NAPHTHENATE SOLIDS FORMATION FROM LIQUID HYDROCARBONS

FIELD OF THE INVENTION

The present invention relates broadly to the inhibition of naphthenate solids formation from liquid hydrocarbons. In particular, the invention relates to compositions for inhibiting the formation of calcium naphthenate solids during extraction and separation processing of liquid hydrocarbons, for example, in the near well bore and well bore, or in process equipment such as separators. The invention further relates to methods for inhibiting formation of such naphthenate solids utilising the compositions of the invention.

BACKGROUND TO THE INVENTION

The formation of solids and emulsions in crude oil during extraction and separation processing presents a plethora of problems that may lead to production delays and/or an inferior sales product(s). These solids and emulsions possess distinct physical and chemical properties. They also tend to originate from crude oils of differing hydrocarbon contents and, once formed, pose their own unique set of problems. For example, the formation of solids may result in:
    the slowing or complete cessation of oil flow in pipelines;
    plugging of chokes, valves, pumps and vessel internals;
    the blocking of water legs in separators;
    unplanned shutdowns due to hardened deposits causing blockages;
    disposal issues due to the presence of heavy metals;
    negative impact on water quality due to an increased oil content in the separated water; and
    negative impact on injection/disposal well performance.

Removal of these solids is often difficult, expensive and potentially hazardous to human health.

The formation of solids precipitation from liquid hydrocarbons such as crude oil generally results from the reaction of metal cations with indigenous naphthenic acids. In this context, naphthenic acids are generally considered to be complex mixtures of alkyl-substituted acyclic and cyclic carboxylic acids that are generated from in-reservoir biodegradation of petroleum hydrocarbons. They are normal constituents of nearly all crude oils and may be present in amounts of up to 4% by weight. The metal cations involved include alkali and alkaline-earth metals such as sodium, potassium, calcium and magnesium. Transition metals such as iron may also be involved. However, most solids normally contain a predominant amount of calcium naphthenate species that are formed from tetraprotic carboxylic acid and/or carboxylate anions and calcium cations. The tetra acids, when they interact with divalent ions, form ionic crosslinks between the multiple acid groups on the tetra acid resulting in a highly crosslinked network. They may precipitate as gummy to hard, solid scale deposits that render control systems inoperable and are detrimental to discharge water and export oil quality.

The calcium naphthenate solids are distinct chemically and physically from the emulsions which are generally associated with sodium carboxylates caused by the reaction of monocarboxylic acids and sodium ions. These are often referred to as carboxylate salts or soaps. They produce flow assurance challenges that are different to the challenges experienced with calcium napthenates as discussed above. It will be appreciated therefore that compositions and methods that may be suitable for inhibiting the formation of sodium carboxylate emulsions may not necessarily be suitable for inhibiting the formation of naphthenate solids.

Variations in observed water chemistry, pH, pressure, temperature and shear are generally accepted as the main factors affecting solids formation. As the pressure lowers, more carbon dioxide is lost from the hydrocarbon phase of the crude oil and the pH rises. This increases the degree of dissociation of the naphthenic acids leading to solids precipitation which accumulate at the oil-water interface, and as described above, may eventually block processing equipment and cause disruption to normal operation of the equipment.

The conventional method of preventing calcium naphthenate solids formation is the addition of relatively high amounts of organic acid. Various other chemical additives have been used to mitigate the formation of precipitates or emulsions in crude oil. For example, US 2005/0282711 A1 and US 2005/0282915 A1 (both to Ubbels et al.) disclose surfactant compositions containing hydrotopes such as mono- and diphosphate esters and methods for inhibiting the formation of naphthenate salts or emulsions. WO 2007/065107 A2 (Baker Hughes Inc.) discloses a method for inhibiting the formation of naphthenic acid solids or emulsions in crude oil in and/or downstream from an oil well.

However, there remains a need for alternative compositions which are more specific to inhibiting naphthenate solids formation from liquid hydrocarbons such as crude oil during extraction or separation processing steps for example, dehydration and gas removal.

SUMMARY OF THE INVENTION

In a first aspect of the invention there is provided a composition for inhibiting the formation of naphthenate solids in a liquid hydrocarbon, the composition including a rosin amine having a formula:

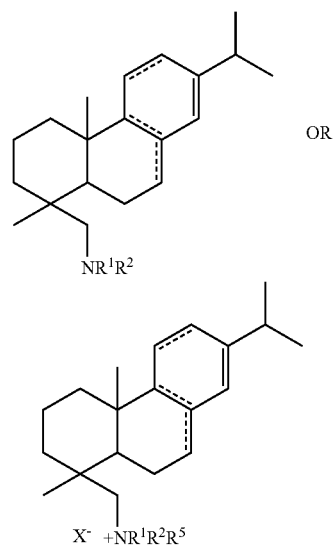

where ==== represents a single or double bond; $R^1$, $R^2$ and $R^5$ each independently represent H, alkyl, alkenyl or an alkynyl group each having between one and ten carbon atoms, —$(R^3O)_n R^4$ wherein $R^3$ is an alkyl group having 1 to 3 carbon atoms and $R^4$ is H, alkyl, alkenyl or an alkynyl group each having between one and ten carbon atoms; n is an integer between 5 and 50; X is a halide, sulphate, phosphate or acetate ion; and a demulsifier intermediate.

The liquid hydrocarbon is not intended to be particularly limited. For instance, the liquid hydrocarbon may be located within an oil well or in processing equipment where precipitation of naphthenate solids has substantially not occurred. The liquid hydrocarbon may but need not have been subjected to a preliminary purification step(s).

The naphthenate solids may contain any number and type of alkali or alkaline-earth metals and naphthenic acids as described above, as well as other non-naphthenate type solids, for example precipitated salts such as $CaCO_3$. However, it is envisaged that the naphthenate solids will predominantly contain calcium naphthenate species. As already noted, in the context of liquid hydrocarbons such as crude oil, "naphthenic acid" includes a complex mixture of alkyl-substituted acyclic and cyclic carboxylic acids represented by a formula R—COOH.

Rosin amines are nitrogenous derivatives from gum rosin. They have a wide range of commercial uses as surfactants, thickening agents, corrosion inhibitors and antifouling agents. Preferred rosin amines of the formulae described above have an unsubstituted amino group, namely $R_1$, $R_2$ and $R_5$ (if present) are all H. Even more preferably, the rosin amine is 1,4a-dimethyl-7-isopropyl-1,2,3,4,4a,9,10,10a-octahydro-1-phenanthrenemethylamine which is commercially available from a variety of sources.

In an alternate embodiment, the rosin amine may be substituted with one or more alkoxy groups. When this is so, it is preferred the rosin amine has one of the formulae described above wherein at least one of $R_1$, $R_2$ or $R_5$ (if present) is —$(R^3O)_n R^4$ and $R^3$ has two carbon atoms. More preferred alkoxylated rosin amines include those in which n is an integer between 9 and 16, and even more preferably, n is either 10 or 15.

Other preferred rosin amines for use in the composition of the invention are ethoxylated derivatives of 1,4a-dimethyl-7-isopropyl-1,2,3,4,4a,9,10,10a-octahydro-1-phenanthrenemethylamine. While the extent of ethoxylation in these derivatives is not particularly limited, it is preferred they contain between about 5 to 50 ethoxyl groups, more preferably between about 5 to 20 ethoxyl groups and even more preferably about 10 or about 15 ethoxyl groups.

A specific example of an alkoxylated rosin amine is RAD 1100 by Akzo Nobel. On the other hand, if not commercially available, the alkoxylated rosin amines may be synthesised by reacting a parent rosin amine with an excess of a suitable alkoxylating agent such as ethylene oxide (for ethoxylated derivatives).

The composition may contain up to about 50% w/w of the rosin amine. However, it is preferred the amount of the rosin amine is between about 6% and 12% w/w.

Any number and type of demulsifier intermediates may be utilised in the composition and method of the invention. Demulsifier intermediates, also known emulsion breakers are used in the oilfield industry to separate water from oil. Demulsifier intermediates include esters, polyglycol esters and ethers, oxalkylated resins with low or high oxide content, sulphonates polymerised oils and esters, alkanolamine condensation products, oxyalkylated phenols, oxyalkylated polyamines, polymerised polyglycols, and oxyalkylated polyglycols. Demulsifers for use in the oil field industry are available from a number of commercial sources and are well known to those of skill in the art. Suitable demulsifies are generally selected based upon their compatibility with the oil with which they are to be used. Thus, the particular demulsifier intermediate(s) selected will vary with the source of the liquid hydrocarbon in which the composition will be used as well as the concentration of naphthenic acids in the liquid hydrocarbon.

In preferred compositions the demulsifier intermediate is selected from the group consisting of D-51, D-601, corrosion inhibitor Duomeen CD and mixtures thereof. Duomeen CD is a coc propylene diamine (MW 257) available from Akzo Nobel. In one embodiment, the composition contains two demulsifier intermediates, preferably D-51 and D-601.

Additional components may be added to the composition. The selection of such components will depend on the required rosin amine chemistry and demulsifier intermediate chemistry as well as the operating pressure and temperature, as well as the inorganic solids and gaseous phase contents of the liquid hydrocarbon.

For example, the composition may include at least one alcohol. This is particularly desirable where the mixture of the liquid hydrocarbon and composition of the invention is conducive to hydrate formation. Preferably, the alcohol is selected from the group consisting of methanol, ethanol, propanol, isopropanol and mixtures thereof.

The composition may also include one or more glycols. Preferred glycols include monoethylene glycol, diethylene glycol, triethylene glycol, propylene glycol and butylene glycol.

In a particular embodiment, the composition includes one alcohol and one glycol. For example, the composition may include methanol and monoethylene glycol. Alternatively, the composition may include isopropanol and monoethylene glycol.

The amount of alcohol in the composition is preferably between about 5% and 80%, preferably between 10% and 60%, more preferably between 20% and 40%. When one alcohol and one glycol are included, the amount of each may be the same or different. For example, the amount of methanol or isopropanol may be between about 55% and 65% and the amount of monoethylene glycol between about 5% and 10%.

At least one acid may be included in the composition where carbonate scale or naphthenate solids are present at the point of application of the compositions of the invention. Generally, most common organic and inorganic acids will be suitable. The acid is preferably selected from the group consisting of sulphuric acid, hydrochloric acid; phosphoric acid, acetic acid, propanoic acid, benzoic acid, benzene sulphonic acid, dodecyl benzene sulphonic acid, isopropylamine dodecyl benzene sulphonic acid and mixtures thereof. Of these, acetic acid and dodecyl benzene sulphonic acid are particularly preferred. The amount of acid is preferably between about 5% and 40%, more preferably between about 10% and 40%, and even more preferably between about 20% and 30%.

Alternatively, the composition may include at least one hydrocarbon solvent, including high and low flash and mutual solvents, for example, hexane, heptane, toluene, xylene, mesitylene and mixtures thereof. Preferably, the hydrocarbon solvent is xylene. A hydrocarbon solvent is preferable when the liquid hydrocarbon containing the naphthenates has initially undergone one or more preliminary purification steps to separate the naphthenate species from other extraneous components, for example, where the liquid hydrocarbon is a crude sludge.

In a second aspect of the invention there is provided a method for inhibiting the formation of naphthenate solids in a liquid hydrocarbon including contacting a composition including a rosin amine having a formula:

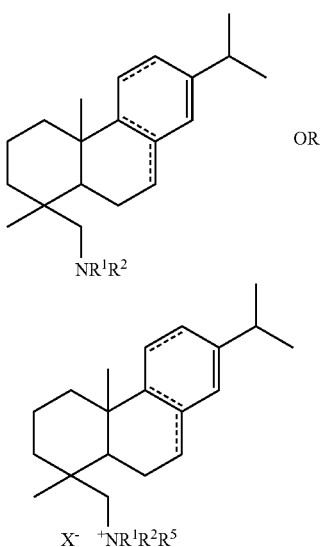

where ---- represents a single or double bond; $R^1$, $R^2$ and $R^5$ each independently represent H, alkyl, alkenyl or an alkynyl group each having between one and ten carbon atoms, —$(R^3O)_nR^4$ wherein $R^3$ is an alkyl group having 1 to 3 carbon atoms and $R^4$ is H, alkyl, alkenyl or an alkynyl group each having between one and ten carbon atoms; n is an integer between 5 and 50; X is a halide, sulphate, phosphate or acetate ion; and a demulsifier intermediate with the liquid hydrocarbon.

Preferred compositions of the invention as described above in respect of the first aspect may be utilised in the method of the second aspect of the invention. Accordingly, the compositions described should be read into the second aspect.

Contact of the composition with the liquid hydrocarbon may be performed at any suitable temperature. Preferably, the composition is contacted with the liquid hydrocarbon at a temperature between about 25 and 95° C., and more preferably between about 60 and 80° C.

Similarly, the amount of composition added to the liquid hydrocarbon is not limited in any way. One of ordinary skill in the art will appreciate the amount will depend on the effectiveness of the composition at inhibiting the formation of naphthenate solids as well as the volume of the liquid hydrocarbon. Nonetheless, in preferred embodiments, the composition is added to the liquid hydrocarbon in an amount of up to about 1000 ppm, more preferably between about 50 ppm and 500 ppm, preferably between about 150 ppm and 400 ppm, more preferably between about 250 ppm and 375 ppm.

Whilst contacting the composition with the liquid hydrocarbon in an industry application may be performed in any suitable manner it is preferable that this occurs before precipitation. In product selection/development applications, the contacting step for laboratory screening will include manually shaking the composition and the liquid hydrocarbon (for example, by hand shaking). The amount of manual shaking will depend on the nature of both the composition and liquid hydrocarbon. Preferably, the number of shakes will be about 100. Alternatively, the composition and liquid hydrocarbon may be sheared.

The method may include the step of adding an acid to the composition and liquid hydrocarbon. This may help resolve any interface that may form between the aqueous and hydrocarbon phases. Preferably, acetic acid is used and the amount added is between about 250 ppm and 500 ppm.

As will be demonstrated in more detail below, the inhibition of naphthenate solids is greatly enhanced by the compositions of the present invention relative to untreated liquid hydrocarbons.

Embodiments of the invention will now be discussed in more detail with reference to the example which is provided for exemplification only and which should not be considered limiting on the scope of the invention in any way.

DETAILED DESCRIPTION OF THE DRAWING

FIG. 1 illustrates the treatment of crude sample Y with the corresponding buffered synthetic water in the absence of an inhibitor (left) and presence of 500 ppm of inhibitor formulation E (right) after 10 (A), 20 (B) and 30 minutes (C).

EXAMPLE

A sample of crude sludge X and crude oil Y were used for testing and identifying suitable inhibitor formulations of calcium naphthenates.

Both samples were purified and analysed to determine the amount of clay, asphaltenes and naphthenate/paraffinic components.

With respect to inhibitor formulation testing, only the naphthenate/paraffinic fraction of sample X was used, while sample Y was used without purification.

Purification of Samples (i) Removal of Clay and Insoluble Matter

To a sample of X or Y (50 g) was added a mixture of acetic acid (50 mL) and toluene (450 mL). The upper hydrocarbon layer containing the naphthenates, asphaltenes and other paraffinic components was separated from the lower aqueous layer and subjected to further purification. The lower layer containing the acetic acid, clay and insoluble matter were then mixed and filtered to estimate the clay content.

(ii) Removal of Asphaltenes

The upper hydrocarbon layer containing the naphthenates, asphaltenes and other paraffinic components was treated with n-heptanes in a ratio of 1:10 and the solution left overnight to deposit the asphaltenes. The deposited asphaltenes were filtered, dried and weighed. The filtrate was collected and subjected to further purification.

(iii) Determination/Recovery of Naphthenates

Sample X

The collected filtrate was evaporated to dryness at 60° C. to obtain a residue of the naphthenates and other paraffinic components. The weighed residue was dissolved in toluene (500 mL) to obtain a 0.1% stock solution (50 g crude sludge X to 500 mL toluene) for the inhibitor formulation testing. As will be described below, this solution could be used at its present concentration or diluted further if desired.

Sample Y

The Total Acid Number (TAN, mg KOH/g) value was determined using the Standard Test Method for Acid Number of Petroleum Products by Potentiometric Titration (ASTM-D664). The naphthenic acid concentration of sample Y was estimated to be about 0.001%.

The amount of each component from samples X and Y is listed in Table A.

TABLE A

Percentage of components from samples X and Y.

| Component | Sample X | Sample Y |
|---|---|---|
| Clay and insoluble matter (%) | 10.13 | trace |
| Asphaltenes (%) | 13.46 | 10.62 |
| Naphthenates and paraffinic components (%) | 24.14 | n/a |
| TAN (mg KOH/g) | n/a | 3.13 |

Naphthenate Inhibitor Testing
Preparation of Buffered Synthetic Water

The synthetic water utilised in the naphthenate inhibitor testing was initially prepared to mimic the total dissolved solid content of water present at the site of collection of samples X and Y (obtained from previous analyses). The type and quantity of ionic species in each water sample is set out in table B.

TABLE B

Ionic species and their quantity present in synthetic water samples corresponding to onsite water collected at the sites of samples X and Y.

| Ionic species | Sample X | Sample Y |
|---|---|---|
|  | Quantity in mg/L |  |
| Calcium $Ca^{2+}$ | 68.14 | 596 |
| Magnesium $Mg^{2+}$ | 10.95 | 165 |
| Sodium as $Na^+$ | 2633.5 | 12899 |
| Potassium as $K^+$ | 223 | 10291 |
| Chlorides as $Cl^-$ | 4059.03 | 19505 |
| Sulphates as $SO_4^{2-}$ | 76.86 | 842 |
| Bicarbonates | 3046 | 2240 |
| Barium as $Ba^{2+}$ | 1.88 | n/a |
| Strontium as $Sr^{2+}$ | 1.94 | n/a |

The pH of the synthetic water corresponding to samples X and Y was 7.8 and 7.7 respectively. However, due to the relatively high content of bicarbonates, calcium carbonate began to precipitate from each water sample. To avoid filtering the calcium carbonate from the water (which in turn would alter the calcium composition), the pH of each water sample was lowered to 5 with acetic acid to redissolve the calcium carbonate, then raised to 7.2 with sodium acetate. This latter pH was in accordance with the pH of the onsite water taken from the first stage separator of a processing facility as measured using the Multiscale tool at 65° C., 8 bar $CO_2$ and 0.5% $H_2S$.

The use of buffered synthetic water facilitates the creation of soaps at the interface with mere manual shaking of the testing bottle. This avoids the need for an inconvenient motor mixing or shearing step while in the field. Naphthenate solids will form at the oil/water interface in the absence of an effective inhibitor.

Demulsifier Intermediate Compatibility with Sample X

The demulsifier intermediate included in formulations A to D (below) were tested individually for their compatibility with sample X at the required pH (Table C). Initially, their compatibility could not be determined when the concentration of sample X was diluted from 0.1% to 0.001% due to the presence of a soapy interphase. Thus, sample X was further diluted to 0.0001% where no soapy inter phase was observed. The compatible demulsifier intermediate, D-51 and D-601, were selected for further formulation along with rosin amine (see inhibitor formulation A below).

TABLE C

Compatibility of various demulsifier intermediates with sample X (diluted to 0.0001%).

| Demulsifier | % activity | | Dose rate (ppm) | | | |
|---|---|---|---|---|---|---|
|  | 45% | 100% | | | | |
| Intermediate | active | active | 10 | 50 | 100 | 1000 |
| D-51 | 10% | 22.22% | Ok | Ok | Ok | Hazy water |
| D-609 | 7% | 15.55% | Ok | Soapy interphase | Soapy interphase | Soapy interphase |
| D-601 | 6% | 13.33% | Ok | Ok | Ok | Ok |
| Duomeen CD | 8% | 17.78% | Ok | Soapy interphase | Soapy interphase | Soapy interphase |

Inhibitor Formulations A to E

The following inhibitor formulations A to E were tested:

TABLE D

Contents of Inhibitor Formulations A to E (Rosin Amine = 1,4a-dimethyl-7-isopropyl-1,2,3,4,4a,9,10,10a-octahydro-1-phenanthrenemethylamine).

| Component | Inhibitor Formulation (%) | | | | |
|---|---|---|---|---|---|
|  | A | B | C | D | E |
| Rosin Amine* | 10 | 6.25 |  |  | 6.25 |
| Rosin Amine (10 mol ethoxylated) |  |  | 6.25 |  |  |
| Rosin Amine (15 mol ethoxylated) |  |  |  | 6.25 |  |
| D-51 | 2.5 |  |  |  |  |
| D-601 | 2.5 |  |  |  |  |
| Duomeen CD |  | 0.5 | 0.5 | 0.5 | 0.5 |
| Dodecyl Benzene Sulfonic Acid |  | 25 | 25 | 25 | 25 |
| Xylene | 85 |  |  |  |  |
| Monoethylene Glycol |  | 6.25 | 6.25 | 6.25 | 6.25 |
| Methanol |  | 62 | 62 | 62 |  |
| Isopropanol |  |  |  |  | 62 |

General Procedure for Inhibitor Formulation Testing

In the case of sample X, the 0.1% stock solution containing the naphthenates and paraffinic components was used either as is or diluted further to 0.01% or 0.001% with toluene for use in the testing experiments.

As noted above, sample Y was used without purification.

In either case, a blank run was also performed by following the identical procedure without the inhibitor formulation.

To a testing bottle (100 mL) was added either the naphthenate stock solution of sample X or crude sample Y (50 mL), up to 500 ppm of an inhibitor formulation A to D (Table D) and the corresponding buffered synthetic water (50 mL). The bottle was subject to 100 manual shakes then immersed in a water bath at 65 to 70° C. The appearance of the interphase was observed after 15 and 30 minute intervals (Table E). In certain experiments, 250 ppm acetic acid was added after 30 minutes and the bottle subjected to a further 100 manual shakes and re-immersed in the water bath at 65 to 70° C. for an additional 30 minutes. The appearance of the interphase was observed again. A grind out was performed to confirm the soap removal and the pH of the discharge water was measured (Table F).

Results

TABLE E

Observations of inhibitor formulation testing (prior to acetic acid addition). A 0.001% stock solution of sample X was utilised (representative of typical field concentration and testing).

| Sample | Formulation | Quantity of Formulation (ppm) | Immediate appearance | After 15 minutes | After 30 minutes | Water quality | Comment |
|---|---|---|---|---|---|---|---|
| X | A | 0 | bulky soap, no water separation | 10 mL interface | 5 mL interface, thick soap | clear | soap into aqueous phase |
| | | 100 | bulky soap, no water separation | 10 mL interface | 2 mL interface, thick soap | clear | soap into aqueous phase |
| | | 250 | bulky soap with 10 mL water separation | 5 mL interface | 2 mL interface | slightly opaque | soap into aqueous phase |
| | | 500 | bulky soap with 40 mL water separation | 2 mL interface | traces of soap | slightly opaque | soap into oil phase |
| Y | B | 0 | bulky soap, no water separation | 20 mL interface | no clear interface | cloudy | oil into aqueous phase |
| | | 100 | bulky soap, no water separation | 10 mL interface | 5 mL interface, thick soap | cloudy | oil into water |
| | | 250 | bulky soap with 40 mL water separation | 5 mL interface | 2 mL interface | slightly opaque | oil into water |
| | | 500 | bulky soap with 40 mL water separation | sharp, clear interface | sharp, clear interface | slightly opaque | soap into oil phase |
| | C | 500 | bulky soap with 10 mL water separation | sharp, clear interface | sharp interface | very clear water | clear oil |
| | D | 500 | bulky soap with 10 mL water separation | sharp, clear interface | sharp, clear interface | clear water | clear oil |
| | E | 250 | — | — | — | — | no separation |
| | E | 500 | — | sharp, clear interface | sharp, clear interface | dirty | oil into water |

TABLE F

Observations of inhibitor formulation testing after 30 minutes and addition of 250 ppm acetic acid.

| Sample | Formulation | Quantity of Formulation (ppm) | Immediate appearance | Water quality | Grind out | pH of the discharge water |
|---|---|---|---|---|---|---|
| X | A | 0 | 2 ml interphase with soapy interface | clear | 5% soap | 6.75 |
| | | 250 | clear sharp interface | slightly opaque | nil | 6.59 |
| | | 500 | clear sharp interface | slightly opaque | nil | 6.61 |
| Y | B | 0 | 5 ml interphase with soapy interface | clear | 5% soap | 6.6 |
| | | 250 | clear sharp interface | slightly opaque | nil | 6.5 |
| | | 500 | clear sharp interface | slightly opaque | nil | 6.51 |

As illustrated in FIG. 1, the addition of inhibitor formulation E (500 ppm) to crude sample Y prior to treatment with the corresponding buffered synthetic water results in the separation of the aqueous and oil phases with a sharp, clear interface.

From the above observations, it was observed that 250 ppm of formulation A or B followed by 250 ppm of acetic acid was able to clear the soapy interface.

Moreover, 500 ppm of formulations C or D was able to clear the soapy interface and produce very clear water (without the need for acetic acid addition).

Testing of Inhibitor Formulation A with Higher (0.01 and 0.1%) Concentrations of Sample X 0.01%: When the concentration of Rosin Amine in formulation A was increased to 25%, 500 ppm of formulation A produced a clear sharp interface with no addition of acetic acid.

0.1%: When the concentration of Rosin Amine in formulation A was increased to 50%, 1000 ppm of formulation A produced a clear sharp interface with no addition of acetic acid.

It will of course be realised that the above has been given only by way of illustrative example of the invention and that all such modifications and variations thereto as would be apparent to persons skilled in the art are deemed to fall within the broad scope and ambit of the invention as herein set forth.

The claims defining the invention are as follows:

1. A composition for inhibiting the formation of naphthenate solids from liquid hydrocarbon, the composition including a rosin amine having formula:

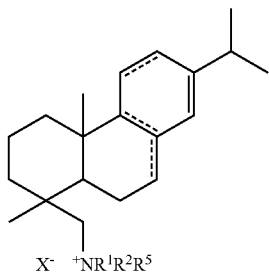

where ═══ represents a single or double bond; $R^1$, $R^2$ and $R^5$ each independently represent H, alkyl, alkenyl or an alkynyl group each having between one and ten carbon atoms, —$(R^3O)_nR^4$ wherein $R^3$ is an alkyl group having 1 to 3 carbon atoms and $R^4$ is H, alkyl, alkenyl or an alkynyl group each having between one and ten carbon atoms; n is an integer between 5 and 50; X is a halide, sulphate, phosphate or acetate ion; and a demulsifier intermediate, the composition further including at least one of: a glycol selected from monoethylene glycol, diethylene glycol, triethylene glycol, propylene glycol and butylene glycol, and at least one hydrocarbon solvent selected from hexane, heptane, toluene, xylene, mesitylene and mixtures thereof.

2. The composition of claim 1, wherein $R^1$, $R^2$ and $R^5$ are H.

3. The composition of claim 2, wherein the rosin amine is 1,4a-dimethyl-7-isopropyl-1,2,3,4,4a,9,10,10a-octahydro-1-phenanthrenemethylamine.

4. The composition of claim 1, wherein at least one of $R^1$, $R^2$ or $R^5$ is —$(R^3O)_nR^4$ and $R^3$ has two carbon atoms.

5. The composition of claim 4, wherein n is an integer between 9 and 16.

6. The composition of any one of claim 1, wherein the rosin amine is an ethoxylated derivative of 1,4a-dimethyl-7-isopropyl-1,2,3,4,4a,9,10,10a-octahydro-1-phenanthrenemethylamine.

7. The composition of claim 6, wherein the ethoxylated derivative contains between about 5 to 50 ethoxyl groups.

8. The composition of claim 1, wherein the rosin amine is present in the amount of up to about 50% w/w.

9. The composition of claim 1, wherein the demulsifier intermediate is selected from esters, polyglycol esters and ethers, oxalkylated resins with low or high oxide content, sulphonates polymerised oils and esters, alkanolamine condensation products, oxyalkylated phenols, oxyalkylated polyamines, polymerised polyglycols and oxyalkylated polyglycols, preferably the group consisting of D-51, D-601, and Duomeen CD.

10. The composition of claim 1, further including at least one alcohol.

11. The composition of claim 10, wherein the at least one alcohol is selected from the group consisting of methanol, ethanol, propanol and isopropanol.

12. The composition of claim 10, wherein the at least one alcohol is present in the amount between about 5% and 80.

13. The composition of claim 1, further including at least one acid.

14. The composition of claim 13, wherein the at least one acid is selected from the group consisting of sulphuric acid, hydrochloric acid, phosphoric acid, acetic acid, propanoic acid, benzoic acid, benzene sulphonic acid, dodecyl benzene sulphonic acid and isopropylamine dodecyl benzene sulphonic acid.

15. The composition of claim 13, wherein the at least one acid is present in the amount between about 5% and 40%.

16. The composition of claim 13, wherein the composition includes at least one acid and at least one alcohol.

17. The composition of claim 1, further including at least one hydrocarbon solvent including high and low flash and mutual solvents.

18. A method for inhibiting the formation of naphthenate solids in a liquid hydrocarbon including contacting a composition including a rosin amine having a formula:

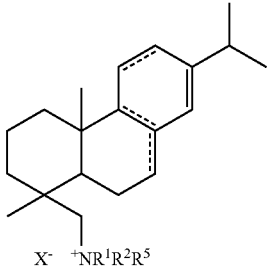

where ═══ represents a single or double bond; $R^1$, $R^2$ and $R^5$ each independently represent H, alkyl, alkenyl or an alkynyl group each having between, one and ten carbon atoms, —$(R^3O)_nR^4$ wherein $R^3$ is an alkyl group having 1 to 3 carbon atoms and $R^4$ is H, alkyl, alkenyl or an alkynyl group each having between one and ten carbon atoms; n is an integer between 5 and 50; X is a halide, sulphate, phosphate or acetate ion; and a demulsifier intermediate;

the composition further including at least one of: one or more glycols selected from monoethylene glycol, diethylene glycol, triethylene glycol, propylene glycol and butylene glycol, and a hydrocarbon solvent selected from hexane, heptane, toluene, xylene, mesitylene and mixtures thereof.

19. The method of claim 18, wherein the rosin amine is 1,4a-dimethyl-7-isopropyl-1,2,3,4,4a,9,10,10a-octahydro-1-phenanthrenemethylamine or an ethoxylated derivative thereof.

20. The method of claim 18, wherein the composition is added to the liquid hydrocarbon in an amount of up to about 1000ppm.

21. The method of claim 18, wherein the composition is contacted with the liquid hydrocarbon at a temperature between about 25 and 95° C.

22. The method of claim 18, further including the step of adding an acid to the composition and liquid hydrocarbon.

23. The method of claim 22, wherein the acid is acetic acid.

24. The method of claim 23, wherein the amount of acetic acid is between about 250ppm and 500ppm.

\* \* \* \* \*